United States Patent Office 3,424,281
Patented Jan. 28, 1969

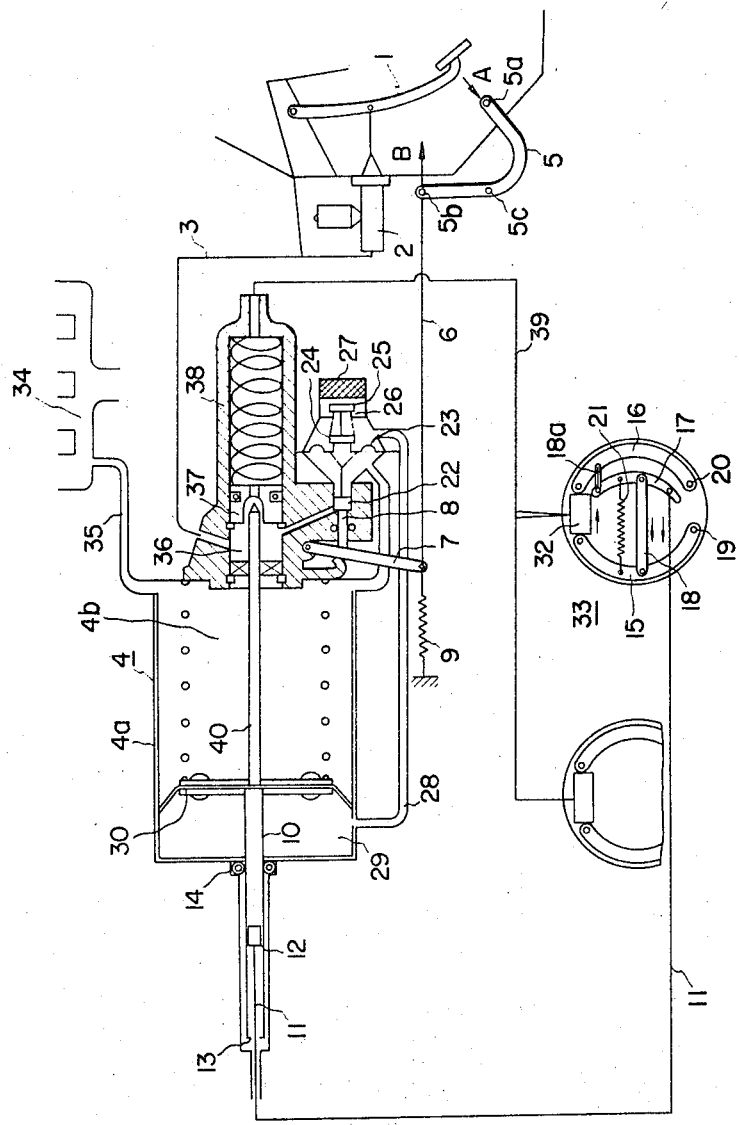

3,424,281
EMERGENCY BRAKE SUB-SYSTEM IN
AUTOMOTIVE BRAKE SYSTEM
Tsuneo Kawabe and Toyoaki Kobayashi, Kariya-shi,
Japan, assignors to Aishin Seiki Kabushiki Kaisha,
Kariya-shi, Japan, a joint-stock company of Japan
Filed June 1, 1967, Ser. No. 642,761
Claims priority, application Japan, June 7, 1966,
41/36,718
U.S. Cl. 188—106          1 Claim
Int. Cl. F16d 65/24; F15b 7/08

ABSTRACT OF THE DISCLOSURE

A mechanism is actuated by excessive stroke of a brake pedal to operate a booster installed between a master cylinder normally actuated by the same brake pedal and the wheel brakes in a vehicle brake system of pneumatically-boosted hydraulic type, and the resulting operation of the booster is utilized to actuate another mechanism to effect mechanical operation of the wheel brakes. The brake pedal is depressed through the excessive stroke as a natural consequence when a failure occurs in the brake hydraulic system, whereby the brake system is immediately changed over to a mechanical system.

---

This invention relates to braking systems of the hydraulic type, pneumatic-hydraulic type, and the mechanical type. More particularly, the invention concerns a new emergency brake sub-system operating when a failure occurs in a main hydraulic brake system to change over the braking action to a mechanical brake mechanism thereby to accomplish braking.

It is an object of the present invention to provide an emergency brake sub-system of the above stated character which is inoperative when the main hydraulic brake system is operating normally but is immediately operated, by the same brake pedal as that for normal braking, in an emergency caused by failure in the hydraulic system to accomplish mechanical braking without the necessity for any special manual operations thereby to afford greater assurance of safety in driving.

Another object of the invention is to provide an emergency brake sub-system of the above stated character which is of relatively simple organization and simple and positive operation.

According to the present invention, briefly summarized, there is provided, in a vehicle brake system of pneumatic-hydraulic type having a master cylinder which operates through a pneumatic-hydraulic booster in which differential air pressure is utilized to produce the main hydraulic braking action and having a brake pedal actuated normally within a specific stroke range to operate the master cylinder, an emergency brake sub-system comprising a mechanism operated by a brake pedal stroke exceeding the specific normal range to place the booster in operation and another mechanism operated by this operation to apply mechanical braking action to the wheeel brakes.

The nature, principle, and details of the invention, as well as the utility thereof, will be more clearly apparent from the following detailed description with respect to a preferred embodiment of the invention when read in conjunction with the accompanying drawing.

In the drawing, the single figure is a schematic diagram, with parts cut away and with a part in longitudinal section, showing the essential parts of a vehicular brake system provided with an example of an emergency brake sub-system embodying the invention.

Referring to the drawing, the brake system illustrated therein is normally operated by control action initiated by the depression of a brake pedal 1 coupled to a master cylinder 2. Hydraulic pressure thereby produced in the master cylinder 2 is transmitted through a brake pressure pipe line 3 to the driving side chamber 36 of a hydraulic cylinder 38, which in combination with a main power cylinder 4a constitutes a brake booster 4. The hydraulic cylinder 38 has therewithin a hydraulic piston 37, and the power cylinder 4a has therewithin a main piston 30 fixed coaxially to a piston rod 40, which abuts at its extreme inner end against the driving side of the hydraulic piston 37.

An emergency lever 5 pivoted at point 5c on the vehicle frame is so positioned that one end 5a thereof is pressed in the direction of arrow A by the free end of the brake pedal 1 when it moves beyond the end of its normal operational stroke, whereby the other end 5b of the lever 5 is moved in the direction of arrow B. The end 5b of the emergency lever 5 is connected to one end of a link or actuating rod 6, the other end of which is connected to the free end of an actuating lever 7 pivoted at its other end on a part of the booster 4. The lever 7 is urged toward its inoperative or normal position (toward the left as viewed in the drawing) by a spring 9, which thereby functions as a return spring for the linkage consisting of the arm of end 5b of the emergency lever 5, the actuating rod 6, and the lever 7. The lever 7 is operable through this linkage to push a piston rod 8 as described hereinafter.

The main piston 30 in the main power cylinder 4a is fixed at its center to an actuating tube 10 disposed coaxially with the cylinder 4a and extending outward from the cylinder head slidably through a closely contacting seal 14 supported on the cylinder head. Within this actuating tube 10, there are disposed a brake cable 11 and a plug 12 fixed to the inner extremity of the cable 11 in slidable contact with the inner surface of the tube 10. The extreme outer end of the actuating tube 10 is provided with an engagement catch 13 for engagement with the plug 12.

The brake cable 11 extends out of the end of actuating tube 10 and out of the booster and is connected at its other end to one arm of a brake lever 17 provided in each wheel brake 33 of the vehicle. (Only one wheel brake is shown in detail in the drawing.) The brake lever 17, which can thereby be actuated through the brake cable 11, is coupled through links 18 and 18a to conventional brake shoes 15 and 16 respectively pivoted at their ends on one side by pins 19 and 20 and coupled at their other ends to a wheel cylinder 32, by which the brake shoes are normally expanded to press against an outer brake drum (not shown). The brake lever 17 is provided with a return spring 21. In emergency operation, the brake shoes 15 and 16 are operated mechanically through the above described brake cable and linkage.

The aforementioned piston rod 8 is integrally and coaxially connected to a valve piston 22, which is adapted to actuate a diaphragm 23 and valve seats 24 and 25. A port 26 is normally closed by the valve seat 25 but, when the valve seat 25 is actuated, is opened to establish communication between the outside atmosphere and chamber 29 of the booster main cylinder 4a on the driving side of the aforementioned main piston 30 by way of an air cleaner 27, port 26, and a passage 28. The cylinder chamber 4b on the opposite side of the main piston 30 is under a negative pressure obtained from the vehicle engine intake manifold 34 through a pipe line 35.

The brake system of the above described organization according to the invention operates in the following manner.

In normal operation, that is, when there is no abnormality in brake hydraulic system, the brake system of the invention operates to apply braking action in the same manner as an ordinary hydraulic-pneumatic brake system in which a combination of a master cylinder and a brake booster is used. Accordingly, the brake pedal 1 operates in a stroke range in which it does not contact the end 5a of the emergency lever 5, and the actuating tube 10 moves within a stroke range such that the engagement catch 13 formed at the tip of the actuating tube 10 does not engage with the plug 12 at the inner end of the brake cable 11.

When a failure or defect occurs in the brake hydraulic system whereby hydraulic pressure is not generated, the brake pedal 1, upon being depressed, exceeds the stroke range of normal operation and, contacting the end 5a of the emergency lever 5, rotates the lever 5 (in the clockwise direction as viewed in the drawing). The movement of the lever 5 is consequently transmitted through the actuating rod 6, which is thereby moved in the direction of arrow B, and lever 7 to push the valve piston 22, whereby the diaphragm 23 is caused to contact valve seat 24, and the valve seat 25 is pushed toward the right (as viewed in the drawing) to open port 26.

As a result, air passes through the air cleaner 27 and passage 28 and enters chamber 29 of the main cylinder 4a to push the main piston 30 toward the hydraulic cylinder 38. The actuating tube 10 moves in unison with the main piston 30, whereby the engagement catch 13 engages with the plug 12. Consequently, the brake cable 11 is pulled and causes the brake shoes 15 and 16 of each wheel brake to expand thereby to accomplish braking action.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What we claim is:

1. In a vehicle brake system of pneumatic-hydraulic type provided, between a master cylinder and wheel brakes, with a booster device in which air pressure is utilized to produce the main braking action and provided with a brake pedal actuated normally within a specific stroke range to operate the master cylinder, an emergency brake sub-system comprising, in combination means operated by a stroke of the brake pedal exceeding said range to place the booster device in operation and a mechanism operated by said operation of the booster device to apply mechanical braking action to the wheel brakes.

References Cited

UNITED STATES PATENTS

| | | |
|---|---|---|
| 2,116,882 | 5/1938 | Dickey. |
| 3,114,580 | 12/1963 | MacDuff _____ 303—2 |
| 3,183,671 | 5/1965 | Chouings _____ 303—2 X |

DUANE A. REGER, *Primary Examiner.*

U.S. Cl. X.R.

60—54.5; 303—2